July 27, 1943.     H. E. TAUTZ     2,325,082
RIP GAUGE
Original Filed April 13, 1936    3 Sheets-Sheet 1

Inventor
Herbert E. Tautz,
By Carl A. Hellmann,
Attorney

July 27, 1943.  H. E. TAUTZ  2,325,082
RIP GAUGE
Original Filed April 13, 1936   3 Sheets-Sheet 2

Inventor
Herbert E. Tautz,
By Carl A. Hellmann,
Attorney

July 27, 1943. H. E. TAUTZ 2,325,082
RIP GAUGE
Original Filed April 13, 1936   3 Sheets-Sheet 3
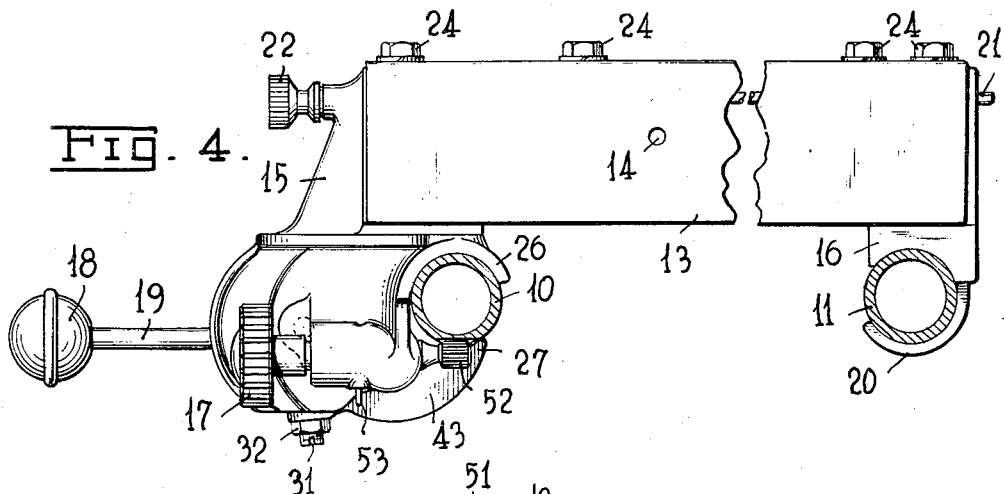
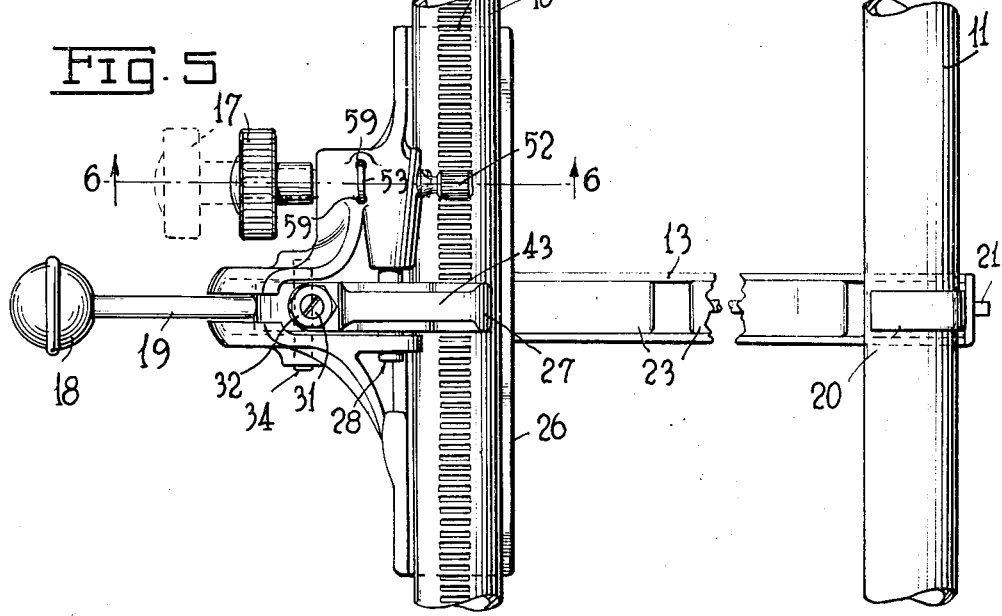
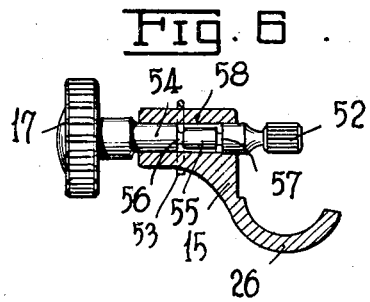
Inventor
Herbert E. Tautz,
By Carl A. Hellmann,
Attorney Patented July 27, 1943

2,325,082

UNITED STATES PATENT OFFICE 2,325,082

RIP GAUGE

Herbert E. Tautz, Milwaukee, Wis., assignor, by mesne assignments, to Delta Manufacturing Company, Milwaukee, Wis., a partnership consisting of Marshall Field, Charles G. Cushing, and H. Campbell Stuckeman Application April 13, 1936, Serial No. 74,177
Renewed March 7, 1940

10 Claims. (Cl. 143—176)

The invention relates to a work-guiding fence for use with mechanically driven tools, more specifically with motor driven woodworking tools, such as circular saws, band saws, scroll saws, abrasive cutting machines, etc.

An object of the invention is to provide new and improved means for guiding such fence or gauge, together with means for clamping one end thereof securely in any selected position along the work table of such machine.

A secondary object is to provide additional means for securing the other end of the gauge in position after the first or main end thereof has been secured by the mechanism above referred to, said second function being produced by means accessible from the same end of the fence as the first means.

More specifically, this is accomplished in accordance with the present invention, by way of example, by a means extending throughout, or substantially throughout, the length of the gauge, having an actuating device cooperating with its forward or accessible end and having at its other end a means for clamping the gauge to the rear of the table.

In the present inventor's U. S. Patent No. 2,106,288, issued on an application Serial No. 745,678 copending with the present case, means are shown for controlling the clamping of the rear end of a rip gauge actuated from the front end of the gauge, but the claim of the said patent is limited to a specific embodiment thereof, whereas it is the patentee's intention to embody the broad or generic claims in the present case.

The invention is illustrated in the accompanying drawings which disclose one particular embodiment thereof.

Figure 1:
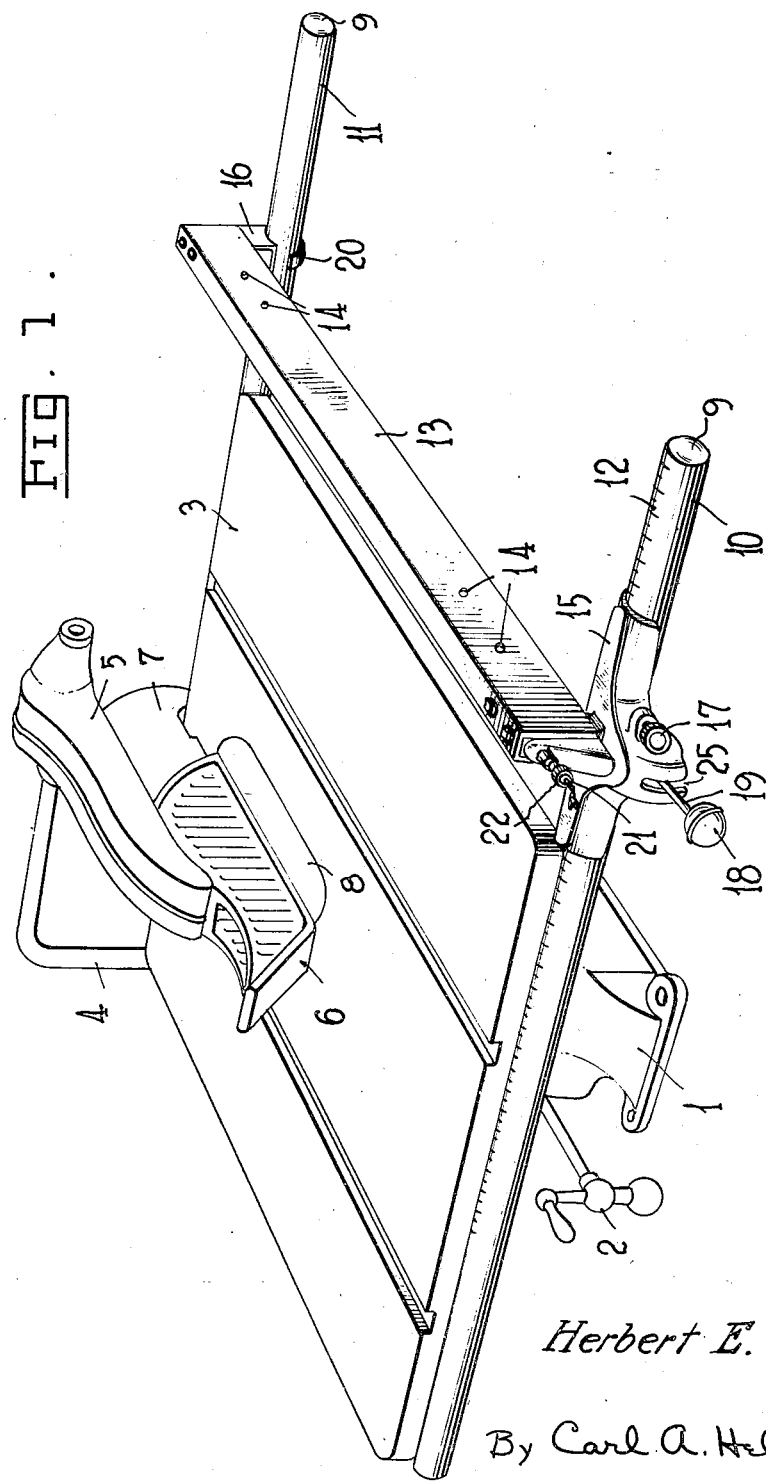
Figure 2:
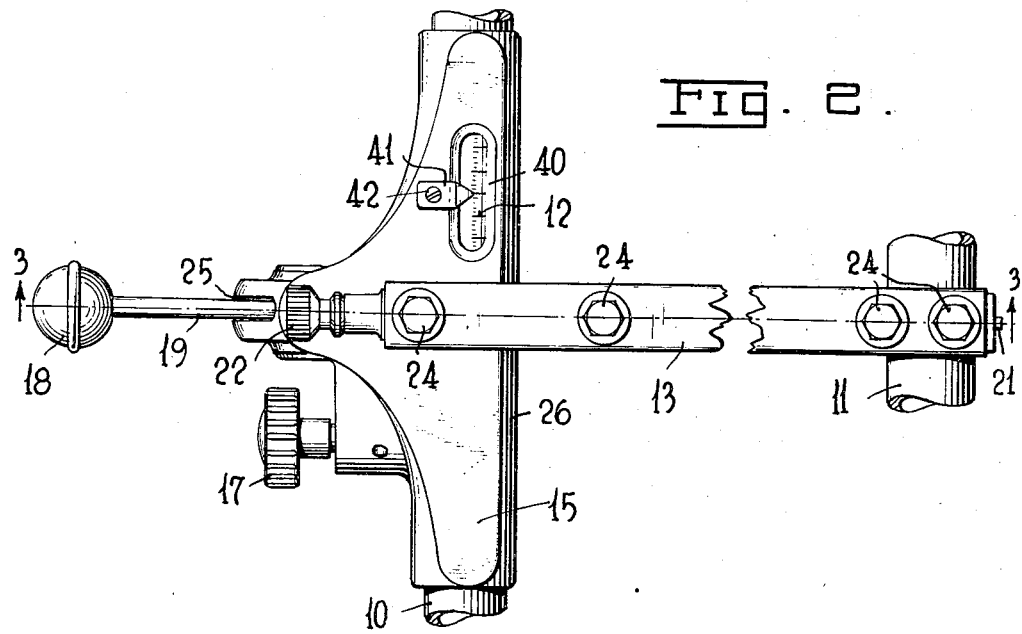
Figure 3:
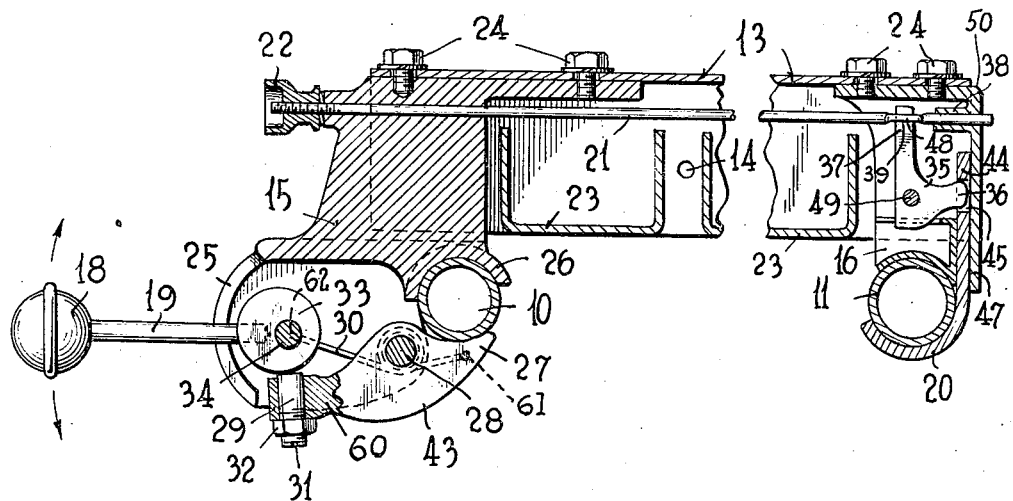

In said drawings:

Fig. 1 is a perspective view showing a rip gauge attached to a circular saw table, said rip gauge embodying features of the invention, Fig. 2 is a top plan view of the rip gauge itself, with an intermediate portion broken away and also showing a portion of each of the tubular guides, Fig. 3 is a longitudinal section through the structure illustrated in Fig. 2, said section being taken in a vertical plane indicated by the line 3—3 of Fig. 2, Fig. 4 is a side elevation of the parts disclosed in Fig. 2, the tubular guides being shown in section, Fig. 5 is a view of the structure shown in Fig. 2 as seen from below and, Fig. 6 is a detail sectional view on the plane indicated by the line 6—6 of Fig. 5.

Similar parts in the various figures are indicated by the same reference characters.

Referring first to Fig. 1 there is shown a circular saw comprising a support or base member 1, having the means 2 for raising or lowering the table 3, said circular saw having a bracket 4 for holding a guard 5, here shown as comprising a basket guard 6, together with a splitter guard 7. There is a removable insert 8 in the table top 3 which is provided with the customary slot through which passes the blade of the circular saw (not visible, because hidden by the basket guard 6). These features are mentioned merely by way of illustration as they do not form part of the present invention.

Secured to the front edge of the table 3 in any suitable manner is a tubular guide 10 and secured to its rear edge is another tubular guide 11, which may or may not be of the same size as the tube 10. The guide 10 preferably has a scale 12 conveniently placed upon its upper surface so as to be readily visible to the operator of the machine when he stands in front of the saw table 3.

The fence or rip gauge proper consists of a prismatic member 13, here shown as a bar of rectangular cross section. The fence bar is preferably hollow so as to reduce its weight while nevertheless securing sufficient rigidity. It may be provided with apertures 14 for receiving screws or bolts to secure auxiliary wooden guides or the like to either face thereof. The fence 13 is mounted at its forward end upon a clamping head or slide member 15, said member 15 being suitably shaped to slide upon the guide member 10, and the head 15 being of sufficient length in the direction of said guide member 10 to secure adequate accuracy and stability of alinement. Preferably the guide bar 13 will be arranged at right angles to the direction of the head 15, although deviations from this position are not necessarily excluded in practicing the invention.

At the rear end of the fence 13 there is a further slide 16 resting and sliding upon the rear tubular guide member 11, but the guide 16 is preferably short, as its chief function is not to hold the bar 13 in any definite angular alinement with respect to the guide 11, but merely to provide means for clamping it securely to such member 11.

Both the guides 15 and 16 are of suitable dimensions and properly placed to allow the fence 13 to slide freely across the upper surface of the table 3, yet without providing any excessive space between the fence 13 and the top of said table. The guide 10 is preferably provided with rack teeth 51 cooperating with a pinion actuable by the knob 17, such features being disclosed in greater detail in Figs. 4, 5 and 6.

An operating lever 19 having a suitable knob or the like 18 cooperates with mechanism within the head 15 for clamping said head 15 rigidly to the front guide 10, whenever desired, by shifting said knob 18.

A hook 20 cooperates with the rear guide 11 and is itself actuable by means of a rod 21 and nut 22, so arranged that rotation of the nut 22 in the proper direction will draw the hook 20 toward the guide 16, to clamp the tubular guide 11 securely between said guide 16 and said hook 20. These elements will be described in greater detail hereinafter.

Each of the guides 10 and 11 may, if desired, be closed at one or both ends by caps 9 held thereto in any suitable manner. These caps, however, are not in any way essential and may be omitted without detriment to the operation of the device, as they contribute mainly to the appearance of the device. They serve incidentally to maintain the insides of the tubular guides clean, and to prevent the ends of such guides from becoming dented or battered.

Passing now to Figs. 2 and 3, certain of the parts already mentioned are shown on a larger scale for greater clearness. Fig. 3 shows the internal structure of the fence or gauge bar 13, which is a substantially rectangular hollow structure, comprising a member of U-shaped cross section having two vertical flanges, with spacers 23 also of U shape, arranged between said downwardly extending arms of the first-named member and welded thereto. This structure is substantially the same as that disclosed in prior Patents 1,938,548 and 1,963,688 of Herbert E. Tautz, as is also the structure of the opening 40 in member 15, for reading the scale 12, together with the indicating pointer 41 and the screw 42 for holding the same with a slight degree of adjustability.

The front member or head 15 is secured to the fence bar 13 by any suitable means, as, for example, the cap screws 24, which likewise are made to fit loosely through the top of the fence bar so as to permit a slight degree of angular adjustment, to compensate for slight inaccuracies in manufacture and still permit positioning of the fence 13 accurately parallel to the plane of the saw blade, that is, substantially at right angles to the direction of travel of the head 15 along the guide 10.

Passing now to the mechanism for clamping the head 15 to the tubular guide 10, Fig. 3 shows an eccentric or cam 33 to which the lever 19 is secured. This eccentric 33 is revoluble about the shaft or pin 34, which is mounted in the head 15, and wich may either rotate with the said cam 33 in bearings in the housing or else be secured rigidly to the housing in which case the cam 33 may rotate about it, or both parts may be loose. A lever 43 is pivoted about another shaft or stud 28, one arm 27 of said lever bearing against the lower portion of the tubular guide 10 and the other end 60 of said lever carrying an adjustable stop 29, screw-threaded into the end 60 and adjustable by means of a screw driver inserted into its slot 31, a lock nut 32 being provided to retain the stop 29 in its adjusted position.

A spring 30 may be disposed in any desired way to engage the member 43 and some stationary part of the head 15, for example, one end in aperture 61 in arm 27 and the other in aperture 62 in shaft 34, to maintain the lever 43 in a condition tending to tilt it away from contact with the tubular guide 10. The cam or eccentric 33 bearing against the stop member 29 tends to move the arm 60 of the member 43 downwardly whenever the knob 18 is depressed, thereby raising the end 27 of said lever and forcing it against the bottom of the tubular guide 10 in opposition to the action of the said spring 30. A slot 25 is provided in the head 15 to accommodate the lever 19 and the parts operated thereby, as just described.

Passing now to the rear tubular guide 11, it will be noted that a hook-shaped member 20 cooperates with said guide 11 to retain the same between itself and the upper slide 16. This hook shaped member 20 has a straight portion 44 extending upwardly therefrom and passing through a slot 47 wherein it is vertically movable to the necessary extent. This straight portion 44 has an opening or slot 45 therein which cooperates with the end 36 of one arm of a bell-crank lever 35, whose other arm 37 is engaged in an opening or slot 39 in a flattened portion 48 of the rod 21, already described. The bell-crank lever 35 is pivoted about a shaft or pin 49 journalled or secured in any suitable way in the rear element 50 of the rip gauge or fence. It is obvious that forward motion of the rod 21, which may be produced by turning the nut 22 thereon, will move the vertical arm 37 of the bellcrank lever forwardly and this in turn will cause the horizontal arm 36 to move upwardly, carrying with it the hook 20 and causing said hook 20 to grip the tubular guide 11 tightly between itself and the slide 16.

Referring now to Figs. 4, 5 and 6 it will be noted that most of the structure illustrated in said figures has already been described. These figures, however, show certain additional details as follows:

On the lower portion of the tube 10, rack teeth 51 are provided, which mesh with a pinion 52 carried by the shaft 54 mounted in the slide member 15. This shaft carries an operating head or knob 17 whereby it may be rotated and has a reduced portion 55 located within the bore 58 of the member 15, said reduced portion 55 having on each side a further, deeper groove 56 and 57, respectively. The shaft 54, beyond such grooves, will, of course, fit snugly and rotatably within the bore 58. A U-shaped retaining pin or staple 53 having a certain degree of resilience is inserted through holes 59 in the member 15 and snaps resiliently over the reduced portions or grooves 56 and 57 of the shaft 54.

Because the intermediate portion 55 of the shaft is of slightly larger diameter than the bottoms of either of said grooves, the pin 53 will secure the shaft 54 against longitudinal movement unless sufficient force is exerted to spring the portion 55 of the shaft between the arms of the pin 53. Thus the knob 17 may be employed to shift the shaft 54 longitudinally into either of its end positions, where the pin 53 is engaged either in groove 56 or in groove 57. In the position shown in full lines in Figs. 4, 5 and 6 the shaft 54 has been pushed inwardly as far as possible and in this position the pinion 52 meshes properly with the rack teeth 51 on the tube 10. On pulling the shaft 54 out into the dotted line position shown in Fig. 5, until the pin 53 engages in the groove 57, the pinion 52 will be drawn completely out of contact with the rack teeth 51 and this will allow the head 15 to slide freely back and forth on the tube 10, when otherwise unclamped. The tube 10 will, of course, be engaged between the arcuate portion 26 of the head 15, and the lower cooperating jaw 27 when the knob 18 is pushed downward.

The operation of the rip gauge will be clear from the above description of its structure. Briefly it may be explained as follows:

When the rip gauge is applied to a circular saw or other machine tool, as illustrated by way of example in Fig. 1, it will be slid over the tubes 10 and 11 so that the front member 15 engages with its arcuate portion 26 on the front guide 10 and with the rear slide 16 on the tube 11. The jaw 27 bears beneath the tubular member 10 and upon manipulation thereof by means of the knob 18 on lever 19 and the eccentric 33 operated thereby, the tube 10 will be firmly clamped between jaws 26 and 27, thus holding the head 15 securely on the tube 10. The eccentric or cam 33, of course, is self-locking with respect to the stop member 29.

The tube 11 may likewise be clamped between the slide 16 and the hook-shaped member 20, this being accomplished by turning the knurled nut 22 so as to draw the rod 21 forwardly, thereby actuating the bell-crank lever 35 to draw said hook 20 upward against the tube 11, by means of the straight portion 44. Thus the rip gauge proper 13 will be held firmly at both the front and rear ends thereof against the respective tubes 10 and 11, and both the means for so clamping it are readily accessible from the front.

In order to secure the desired adjustment of the lever 43, the stop 29 may be adjusted by a screw driver until proper clamping and releasing of the tube 10 is secured with a convenient range of motion of the knob 18.

When it is desired to adjust the rip gauge 13 swiftly, this may be done by merely sliding the whole mechanism manually along the rods 10 and 11, but when delicate adjustment is necessary or desirable, such adjustment is furnished by pushing the shaft 54 inward by means of the knob 17 until the pinion 52 engages the rack teeth 51, the clamps on rods 10 and 11, of course, being left loose. It is then possible by turning the knob 17 to provide a very delicate adjustment of the head 15 and the gauge 13 carried thereby. When the proper position of the gauge 13 has been reached, which may be determined by means of the scale 12 and pointer 41, or in any other way, the lever 19 may be depressed by means of the knob 18, thereby causing the arm or jaw 27 to clamp firmly against the bottom of the tube 10. This will bring the gauge 13 into proper parallelism with the saw blade or other tool, by drawing the jaw 26 into alinement with the tube 10. In order to secure greater rigidity when desired, the rear end of the rip gauge 13 may be clamped as already described by means of the jaw 20, controlled by the nut 22.

Having described a preferred embodiment of the invention it will be obvious that changes, omissions and additions may be made therein without departing from the spirit of the invention, which is defined in the following claims.

I claim:

1. In a gauge adapted to cooperate with the table of a woodworking machine, and comprising a head and a work guide carried thereby, said table having a guide track at its forward end, said head being slidably supported by said track, the combination which consists of a lever fulcrumed in said head, one arm of said lever being adjacent said track, and a cam carried by said head for moving the other arm of the lever to cause the lever to pivot about its fulcrum and thereby firmly engage the head to the track by means of the first-named arm, said last-named lever arm carrying an adjustable stop member contacting said cam.

2. A gauge adapted for use with a machine tool having a work table with gauge clamping surfaces along both the front and the rear edges thereof, said gauge being movable over said table, said gauge having a passageway extending therealong and completely enclosed therein, an operating rod extending through such passageway, said rod extending out of the gauge at its front end and carrying screw threads at said end, an adjusting nut threaded thereon and bearing against the front end of the gauge, a bell-crank lever pivoted within the gauge at the rear end of the gauge, said lever having one arm operatively connected with the rear end of said rod, a clamping jaw having an upwardly extending arm, said clamping jaw being adapted to cooperate with the gauge clamping surface at the rear edge of the table, and said upwardly extending arm thereof being engaged by the other arm of the bell-crank lever, whereby actuation of the nut at the head of the gauge will operate the rod to move the said clamping jaw vertically to cause same to engage or release the said table.

3. In a gauge adapted to cooperate with the table of a woodworking machine, and comprising a head and a work guide carried thereby, said table having a guide track at its forward end, said head being slidably supported by said track, the combination which consists of a lever fulcrumed in said head, one arm of said lever being adjacent said track, a self-locking cam carried by said head for moving the other arm of the lever to cause the lever to pivot about its fulcrum and thereby firmly engage the head to the track by means of the first-named arm and adjustable screw-threaded means carried by said second arm of the lever, having an end projecting from the lever, and adapted to engage the cam for adjusting the distance between the cam and said arm.

4. A gauge adapted for use with a machine tool having a work table, gauge supporting means separate from the table but secured thereto adjacent both the front and the rear edges thereof, said means providing gauge clamping surfaces therealong, said gauge being movable over said table, said gauge having a passageway extending therealong and completely enclosed therein, an operating rod extending through such passageway, said rod extending out of the gauge at its front end and carrying screw threads at said end, an adjusting nut threaded thereon and bearing against the front end of the gauge, a bell-crank lever pivoted within the gauge at the rear end of the gauge, said lever having one arm operatively connected with the rear end of said rod, a clamping jaw having an upwardly extending arm, said clamping jaw being adapted to cooperate with the gauge supporting means at the rear edge of the table, and said upwardly extending arm thereof being engaged by the other arm of the bell-crank lever, whereby actuation of the nut at the head of the gauge will operate the rod to move the said clamping jaw vertically to cause same to engage or release the said supporting means.

5. In a gauge adapted to cooperate with the table of a woodworking machine, and comprising a head and a work guide carried thereby, said table having a substantially cylindrical guide track at its forward end, said head fitting on and being slidably supported by said track, the combination which consists of a lever fulcrumed in said head, one arm of said lever being adjacent said track, and a cam carried by said head for moving the other arm of the lever to cause the lever to pivot about its fulcrum and thereby firmly engage the head to the track by means of the first-named arm, said last-named lever arm carrying an adjustable stop member contacting said cam.

6. In a woodworking machine, the combination of a work table having a gauge-guiding surface along the front edge thereof, a gauge movable over said table, said gauge having a work-guiding bar of substantially inverted U-shaped cross section, a clamping member cooperating with said gauge and engageable with the rear of the table, and means for operating said rear clamping member from the front end of the gauge including an operating member covered by the work-guiding bar and extending throughout the length thereof, and actuating means for said operating member, adjacent the front end of the gauge, whereby said work-guiding bar protects the said operating member against mechanical injury as well as against clogging with sawdust and chips.

7. In a woodworking machine, the combination of a work table having a gauge-guiding surface along the front edge thereof, a gauge guided by said surface and movable over said table, said gauge having a work-guiding bar providing a completely covered longitudinal passageway, a clamping member cooperating with said gauge and engageable with the rear of the table, and screw means for operating said rear clamping member from the front end of the gauge, including an element mounted in the gauge and having a portion cooperating with the clamping member, a threaded actuating device engaging said screw means and located near the front end of the gauge, said element extending through said passageway to the front end of said gauge, whereby said element is protected against mechanical contact from above as well as against clogging by sawdust and chips.

8. In a woodworking machine having a work-receiving table and a work-guiding gauge movable thereover, means for guiding and securing the gauge with respect to the table, said means comprising two elongated guide members of substantially circular cross section secured to the table along the front and rear edges thereof, the gauge having correspondingly curved arcuate portions at its respective ends slidably fitting the said two elongated members, and means for securing it at will to both of said members, by clamping said arcuate portions against the respective guide members.

9. In a woodworking machine having a work-receiving table and a work-guiding gauge movable thereover, means for guiding and securing the gauge with respect to the table, said means comprising two elongated tubular members of substantially circular periphery secured to the table along the front and rear edges thereof respectively, the gauge having correspondingly curved arcuate portions at its respective ends slidably fitting the said two tubular members, and means for clamping said arcuate portions against the respective tubular members at will for securing it to both of said members.

10. In a woodworking machine having a work-receiving table and a work-guiding gauge movable thereover, means for guiding and securing the gauge with respect to the table, said means comprising two elongated tubular members of curved periphery secured to the table along the front and rear edges thereof respectively, the gauge having correspondingly curved arcuate portions at its respective ends slidably fitting the said two tubular members, means for clamping the arcuate portions of the front end against the front tubular member for securing it at will to the front tubular member, and means for clamping the arcuate portions of the rear end against the rear tubular member for securing it at will to the rear tubular member, said last named means having an operating device extending to the front end of the gauge.

HERBERT E. TAUTZ.